United States Patent [19]
Jonsson

[11] Patent Number: 5,165,194
[45] Date of Patent: Nov. 24, 1992

[54] LONG-LINE FISHING HOOK APPARATUS
[76] Inventor: Sigurbjörn A. Jonsson, Kvistaland 14, Reykjavik, 108, Iceland
[21] Appl. No.: 756,557
[22] Filed: Sep. 9, 1991
[30] Foreign Application Priority Data
Sep. 14, 1990 [IS] Iceland ..................... 3623
[51] Int. Cl.$^5$ .............................. A01K 91/00
[52] U.S. Cl. ........................... 43/27.4; 43/4
[58] Field of Search ............... 43/4, 27.4, 4.5
[56] References Cited
U.S. PATENT DOCUMENTS

| | | | |
|---|---|---|---|
| 2,511,828 | 6/1950 | Andrist | 43/4 |
| 2,518,590 | 8/1950 | Andrist | 43/4 |
| 4,631,850 | 12/1986 | Chureau | 43/27.4 |
| 4,648,193 | 3/1987 | Alex et al. | 43/27.4 |

FOREIGN PATENT DOCUMENTS 0470992  1/1951  Canada ..................... 43/4

Primary Examiner—Richard K. Seidel
Assistant Examiner—James Miner
Attorney, Agent, or Firm—Richard C. Litman

[57] ABSTRACT

A long-line fishing hook apparatus includes an orientation station for serially receiving and orienting hooks on snoods as the hooks are drawn by a moving long-line. Initially, the hook bend of the hooks are drawn through a hook slot in a pipe and when advanced to an angularly offset shifting slot, are deflected therethrough by a shifting bar actuated by an enlargement on each snood. This deflection guides the hook bends into a bottommost slot which guides them past a sensor device. Deformed hooks activate the sensor to position a hook straightening assembly in the path of the traveling hooks. Hooks leaving the orientation station and/or straightening assembly subsequently are directed to a baiting mechanism to complete the readying of the long-line for re-use.

8 Claims, 4 Drawing Sheets

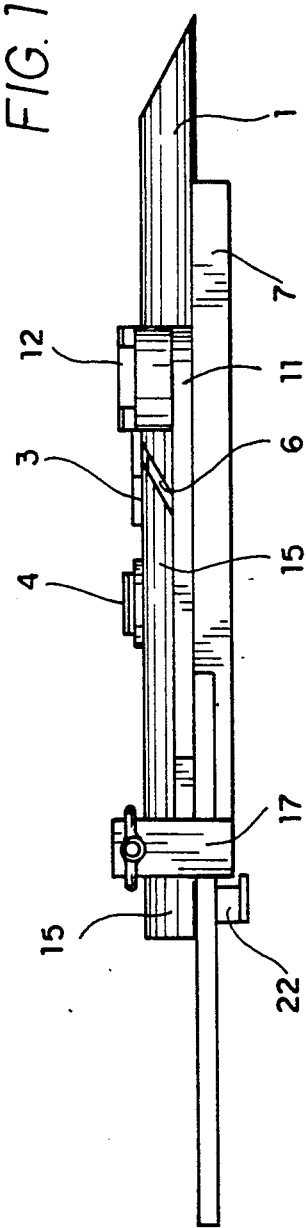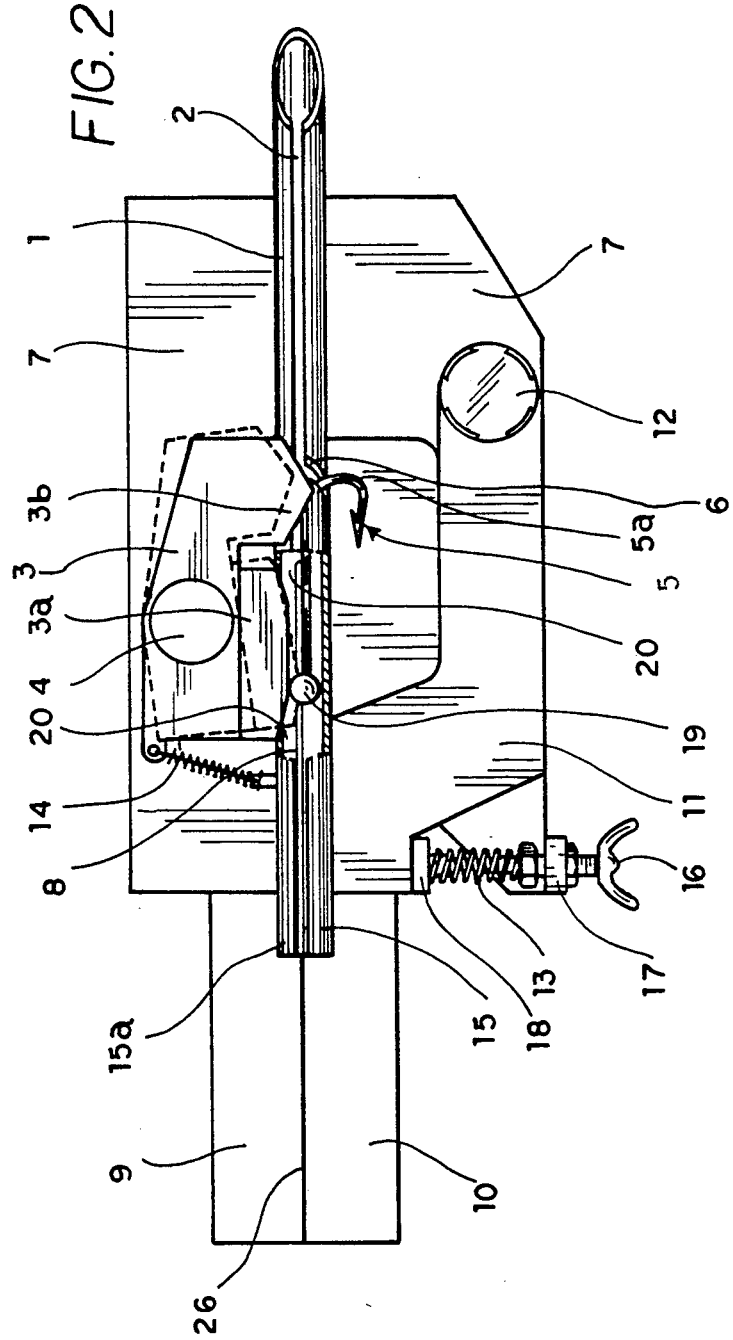

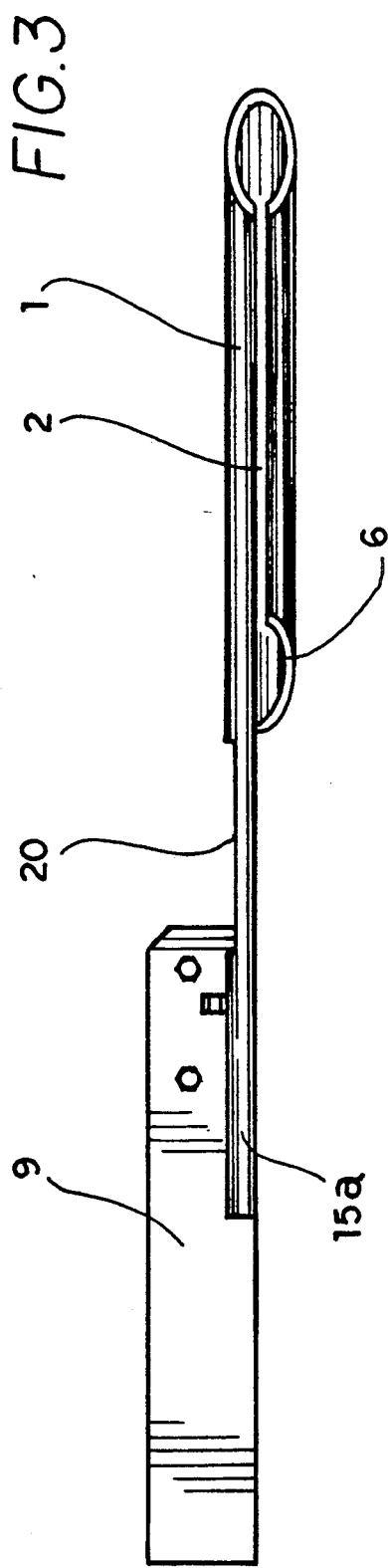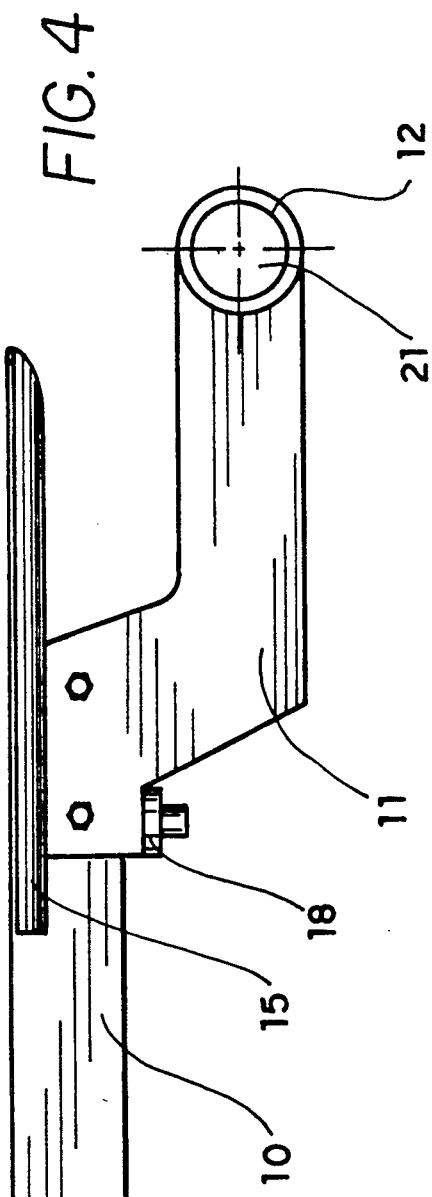

LONG-LINE FISHING HOOK APPARATUS

FIELD OF THE INVENTION

This invention relates generally to a mechanical hook guiding system for baiting and a method and device to adjust crooked hooks and to efficiently bait hooks as used in long-line fishing.

BACKGROUND OF THE INVENTION

It is generally known in the long-line fishing art, to utilize a pipe, channel, or the like for guiding hooks having a knob or protuberance thereon, and which is broadly disclosed in my prior U.S. Pat. No. 4,751,787 issued Jun. 21, 1989. Such apparatus discloses slots for steering hooks, but no means providing knob steering wherein the direction of the hook-bend is changed from one slot to another. Nor is their provided in the known prior art the combination wherein hook readjustment is achieved when necessary, along with hook baiting, all in a continuous manner requiring a minimum of labor.

SUMMARY OF THE INVENTION

By the present invention an improved hook steering or guidance system is provided including a pipe provided with slots arranged to accommodate the knob or protuberance as carried on connected hooks and snoods, in order to steer or guide the fish hook mechanically to measure the bend and the point of the hook for reshaping or straightening, as needed. Reshaping takes place on an anvil cooperating with a hammer/arm if the hook is crooked. The hook guidance system steers the hook into a compartment/box, comprising a baiting box for the most efficient baiting of long-line fishing gear.

BRIEF DESCRIPTION OF THE DRAWING

FIG. 1 is a side elevation of the hook guidance system of the present invention;

FIG. 2 is a top plan view, partly in cross-section, of the apparatus of FIG. 1 and with a hook shown having its hook-bend disposed in the diverter slot;

FIG. 3 is a top plan view of the dual-slotted pipe element;

FIG. 4 is a top plan view of the pressure bar of FIG. 2;

DETAILED DESCRIPTION OF THE PREFERRED EMBODIMENT

Figure 5:
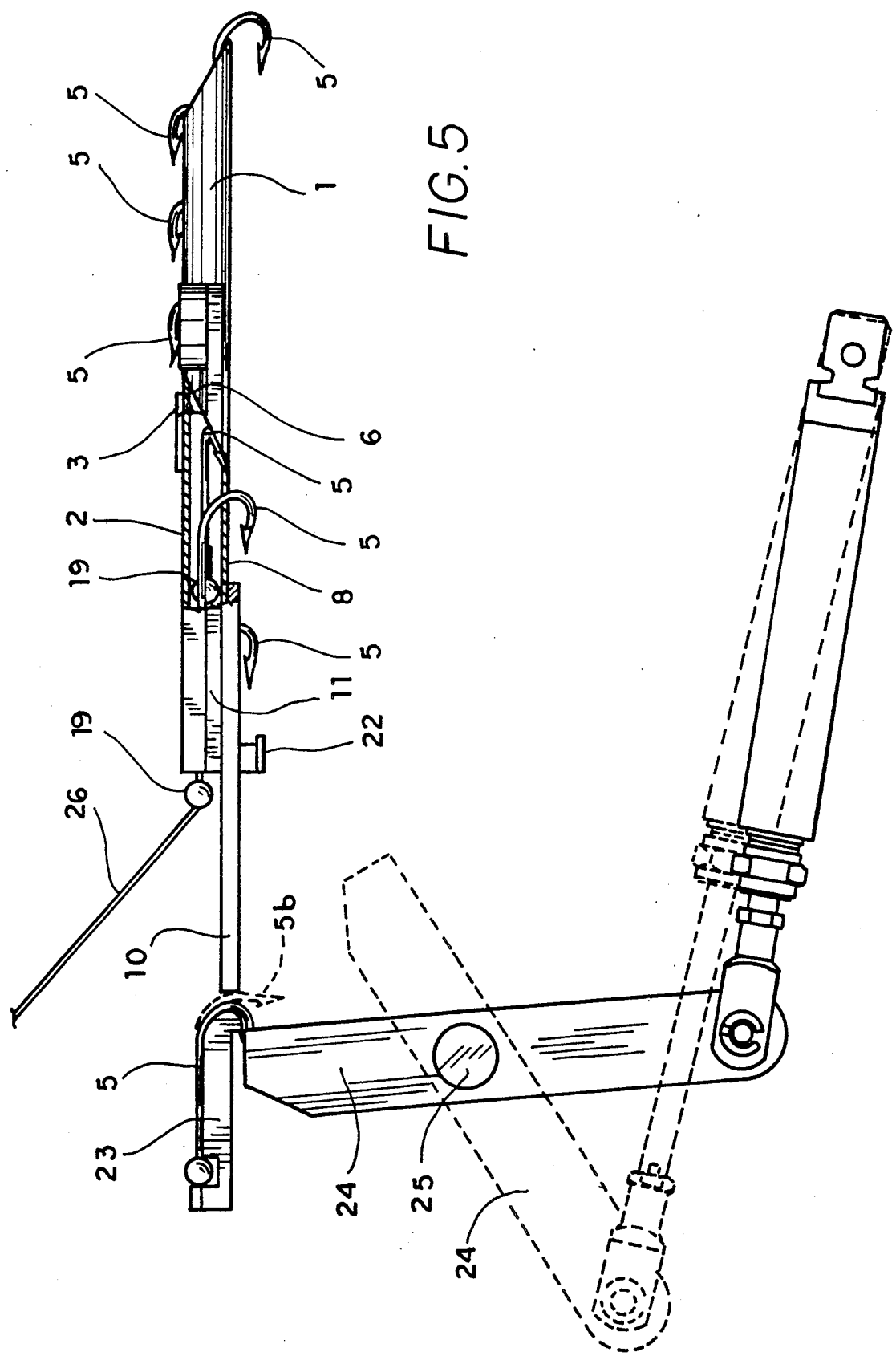
FIG. 5 is a side elevation, partly in cross-section, illustrating the sequence of operation from entry into the slotted pipe, through straightening of a malformed hook.

The invention involves a pipe 1 provided with a plurality of slots. The knob or protuberance 19 on the connected hook 5 and snood 26 and hook shank and part of hook bend passes through pipe 1 with the pull of snood 26 but part of the hook bend and hook point will be seen to pass through the upwardly directed hook and snood slot 2. As the snood protuberance/knob 19 engages and displaces the cam section 3a of a shifting bar/steering bar 3, the nose 3b thereof enters the pipe 1 and steers or urges part of hook-bend 5a and point of the hook 5 into an angular shifting or divergent slot 6 as shown in FIGS. 1 and 2.

The movement of the snood 26 and its hooks 5 toward the left as viewed in the drawings, is regulated by the various components of the instant apparatus. In an at-rest condition, the shifting bar 3 is urged by the pulling spring 14 about its pivot 4 so that the nose 3b is clear of the axial extent of the slot 2. In this position, the cam section 3a is located within a cut-out 20 in the pipe 1 and will be understood to be disposed within the axial path of the pipe interior. In this manner, as each snood knob or projection 19 engages the bar cam section 3a, the bar 3 is pivoted to cause its nose 3b to direct the hook-bend 5a into the angularly directed slot 6 as shown in FIG. 2.

The hook-bend and point then goes into a downwardly directed hook-bend slot 8.

The downwardly directed hook-bend slot 8 is formed by the two half-pipes 15, 15a respectively attached to the jaws 10 and 9. The jaw 10 is pivotally mounted as at 12 and is normally spring urged, by means of the spring 13 and adjustment fittings 16,18, toward the fixed jaw and half-pipe 9,15a, respectively. The pressure as selected by the adjustment fittings insures that as the snood and hook are drawn through the pipe, the hook-bend 5a is subjected to a sliding engagement by the half-pipes 15,15a forming the bottom slot 8.

Figure 6:
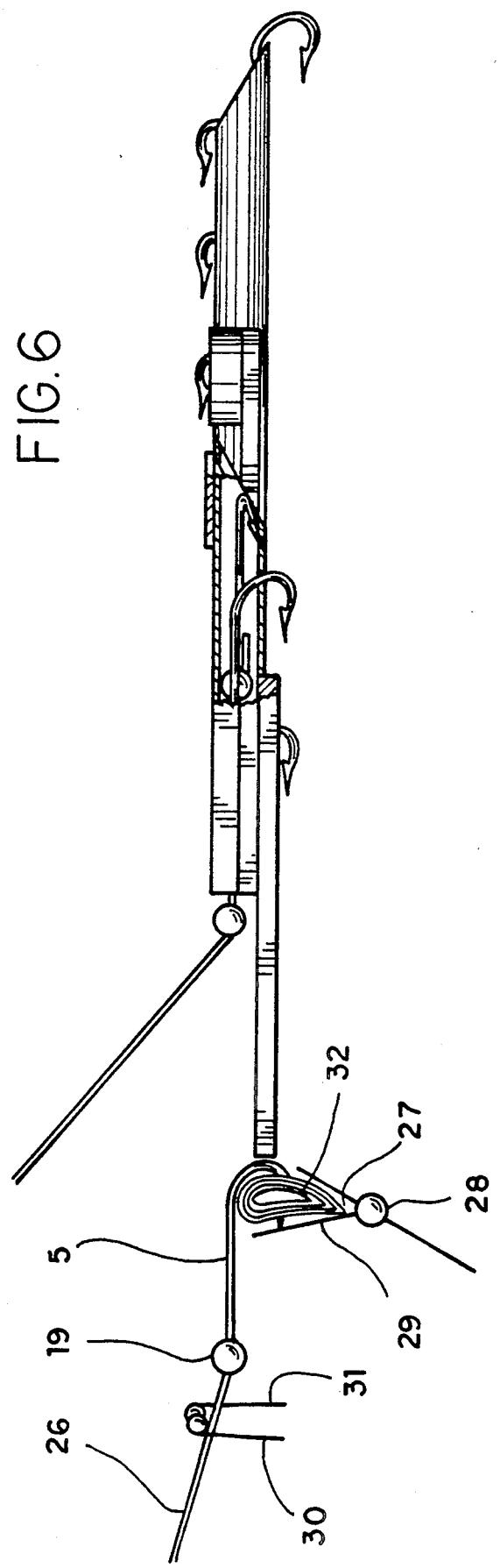
FIG. 6 is a view similar to FIG. 5 and illustrates the subsequent baiting operation.

An adjustable sensor bar/sensor 22 on jaw 10 is disposed across the path of the hook-bend slot 8. If the hook point strikes the adjustable sensor 22 and indicates that the hook point is crooked, then the anvil 23 is activated and receives the bent hook for subsequent manipulation. This sensor bar/sensor 22 can also be on pipe 1. It will be appreciated that the portion of a hook that is bent, such as that shown at 5b in FIG. 5, will not clear the sensor 22 but will strike it to signal that the anvil device should come into play, along the axial extent of the trailing end of the pipe 1. If hook 5 is crooked, it is pulled by the snood 26: to the position shown in FIG. 5 where the hook-bend 5a engages about the nose of the anvil 23 and is shaped into its original form with an arm or hammer 24 that is mounted about a pivot joint 25. Then the hook 5 goes to the baiting station shown in the left portion of FIG. 6. As shown in FIG. 6, the hook is moved into a rotatable baiting box/compartment 27 that is located in front of jaws and 10 or the hook-bend slot 8 of the hook steering system. Hook 5 is guided with knob 19 into bait 32 and while hook 5 is drawn into bait 32, a hindrance 29, that is connected to a pivotal axis 28, holds it in place. In front of hindrance 29 are two adjustable arms 30, 31. They are adjusted in such a way that when hook 5 has properly set into the bait 32 in the necessary precise manner, then knob 19 engages the two arms 30,31 with the snood 26 therebetween and this causes hindrance 29 to pivot open and allow the bait 32 and hook to freely move on. Throughout the entire manipulation of the long-line containing the plurality of snoods and hooks, it will be understood that the very movement of the long-line in a direction from right to left as viewed in the drawings, causes the hooks to pass through the various stages of the present operation. Thus, it is this movement that guides the hooks from stage to stage, ending in the hooks piercing and picking up the bait 32.

The pipe 1 is cut lengthwise to form the hook/snood slot 2 and is configured to present a bit more room than for the material of the hook and snood. The next slot, comprising the shifting slot 6 from the hook/snood slot 2, will be seen from FIG. 2 to be angularly disposed relative to said hook slot and directed downwardly and rearwardly towards the hook-bend slot 8. When the shifting slot 6 and hook-bend slot 8 are cut into pipe 1, the half-pipe 15 will be seen to be formed and this is affixed to the pressure bar 11 as illustrated in FIG. 4. This bar 11 in turn is connected by a pivot bearing 12 to a fixed piece 7 on the pipe 1. Pressure spring 13, adjustment nut 16 and pressure bar 11 cause hook-bend slot 8 to be urged together. In continuation of pipe 1 the two jaws 9, 10 serve to enhance the steering or guidance of the hook-bend 5a as it is drawn therebetween.

The protuberance 19 that is on the connected hook 5 and snood 26 will be understood to direct the hook-bend and point from one slot to another with the knob 19 pushing the shifting bar/steering bar 3 to change the direction of hook-bend and hook point from hook/snood slot 2 into the shifting slot 6 and thence into the hook-bend slot 8. It is also possible to use alternative hindrance means or thickness on the hook 5, differently shaped from knob 19, but a rounded knob has a lesser chance of getting caught in pipe 1. Knob 19 also directs hook 5 efficiently into bait 32 in the baiting box 27.

It will be appreciated that alternative displacement of the bar 3 may be accomplished so as to insure shifting of the hook-bend between the successive slots.

The advantages of this hook steering device are that it is possible to readjust or reshape a hook mechanically into its original form if it is crooked and then move the hook forward in its original form through the steering device into a mechanical baiting through a baiting assembly box that has a hindrance that holds the bait in place while the hook point stabs the bait efficiently. This hook steering system saves manual labor, that is needed to readjust the hook and the hook goes precisely into the bait as determined. Also, by having these slots on the hook steering system, the hook and snood are separated from the line which avoids the line going through leftover bait and therefore results in minimum dirt and smell being picked up. The line therefore has much better durability.

I claim:

1. A long-line fishing hook apparatus for the treatment of traveling hooks as carried on snoods in a longline and wherein a protuberance is provided on the snoods spaced from a bent portion of the hooks, the improvement, comprising;
    a pipe provide with a longitudinally extending hook slot therein adapted to accommodate the bent portion of the hooks as the respective snooks, protuberances and hooks are drawn through said pipe,
    a shifting slot in said pipe communicating with and angularly disposed relative to said hook slot,
    a longitudinally extending hook bend slot communicating with said shifting slot and adapted to accommodate the bent portions of the hooks as received from said shifting slot,
    movable steering means disposed adjacent said shifting slot and engageable by said protuberances when respective ones of said hook bent portions are juxtaposed said shifting slot, whereby
    said protuberances displace said movable steering means to shift said bent portions into said shifting slot,
    sensor means adjacent said hook bend slot for detecting deformed ones of said hook bent portions, and
    forming means adjacent said pipe and operable to reshape ones of said hook bent portions detected by said sensor means as being deformed.

2. A long-line fishing hook apparatus according to claim 1 wherein,
    said hook bend slot is defined between first and second half-pipes,
    a pressure bar attached to said first half-pipe,
    means pivotally mounting said pressure bar and attached said first half-pipe for swinging movement relative to said second half-pipe, and
    adjustable means operable to vary the disposition of said first half-pipe relative to said second half-pipe.

3. A long-line fishing hook apparatus according to claim 2 wherein,
    said adjustable means includes spring means.

4. A long-line fishing hook apparatus according to claim 1 wherein,
    said hook slot bend slot are substantially radially oriented 180 degrees apart.

5. A long-line fishing hook apparatus according to claim 1 including,
    spring means normally urging said movable steering means into said pipe and within the path of said protuberances.

6. A long-line fishing hook apparatus according to claim 1 wherein,
    said forming means includes an anvil generally axially aligned with said pipe, and
    a pivotally mounted hammer operable to reshape deformed ones of said hook bent portions against anvil.

7. A long-line fishing hook apparatus according to claim 1 including,
    hook baiting means disposed generally axially aligned with said pipe.

8. A long-line fishing hook apparatus according to claim 7 wherein,
    said hook baiting means includes a rotatable bait box, and adjustable contact arms operable upon contact by ones of said protuberances to permit rotation of said bait box following baiting of ones of said hooks in said bait box to allow release of baited hooks from said hook baiting means.

* * * * *